April 16, 1940.   V. E. BABCOCK   2,197,675
FISHING REEL
Filed March 7, 1939   2 Sheets-Sheet 1

Inventor
Verner E. Babcock
By Clarence A. O'Brien
and Hyman Berman
Attorneys

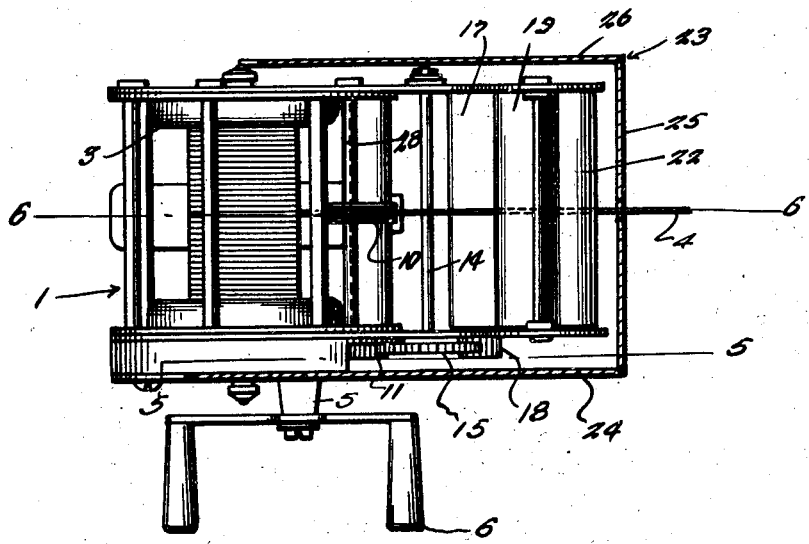
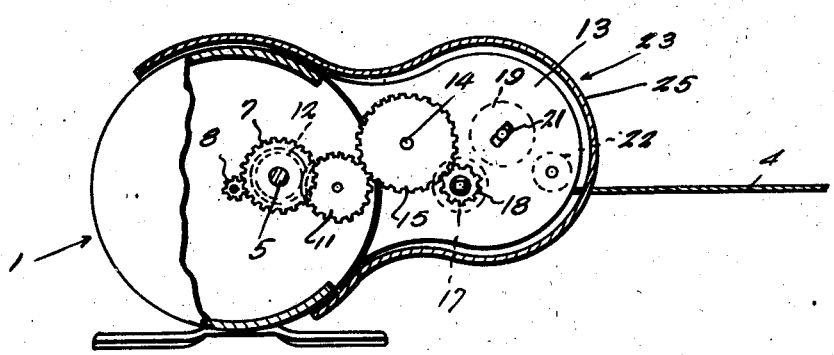

Patented Apr. 16, 1940

2,197,675

UNITED STATES PATENT OFFICE 2,197,675

FISHING REEL

Verner E. Babcock, Port Clinton, Ohio

Application March 7, 1939, Serial No. 260,375

1 Claim. (Cl. 242—84.1)

The present invention relates to new and useful improvements in fishing reels, particularly for casting, and has for its primary object to provide, in a manner as hereinafter set forth, a device of this character comprising novel means for preventing back lash and snarling of the line.

Another important object of the invention is to provide a reel of the aforementioned character comprising a housing of a novel construction and arrangement for enclosing and protecting the mechanism.

Other objects of the invention are to provide a fishing reel of the character described which will be comparatively simple in construction, strong, durable, highly efficient and reliable in use, light in weight, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 4 is a view in horizontal section through the housing, showing the reel in top plan.

Figure 5 is a view principally in vertical longitudinal section, taken substantially on the line 5—5 of Figure 4.

Figure 1:
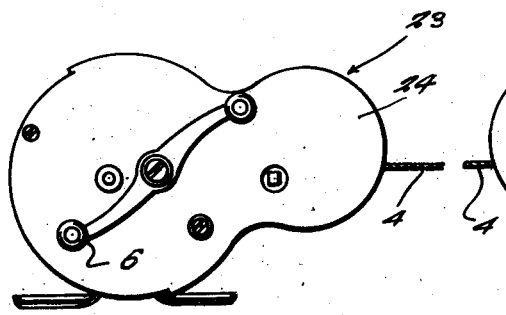
Figure 1 is an elevational view, looking at one side of a fishing reel constructed in accordance with the present invention.
Figure 2:
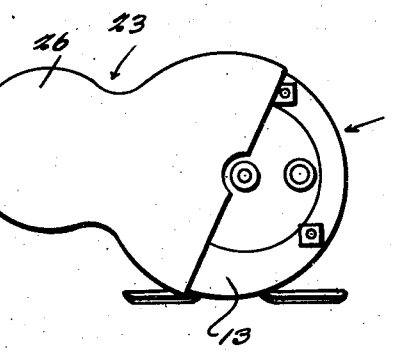
Figure 2 is an elevational view, looking at the other side of the device.
Figure 3:
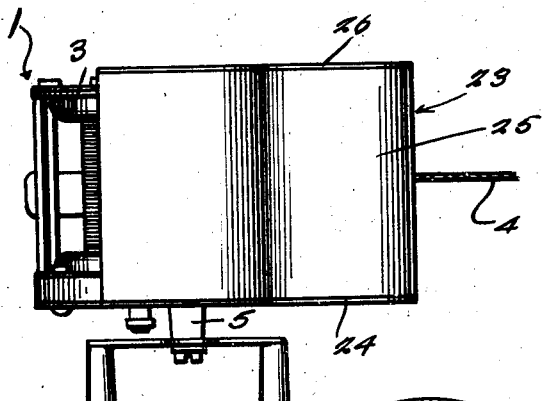
Figure 3 is a top plan view.
Figure 7:
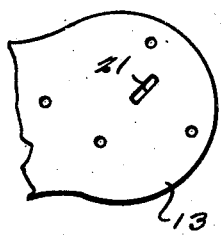
Figure 7 is a detail view in side elevation of the forward portion of one of the roller supporting plates.

Referring now to the drawings in detail, it will be seen that the reference numeral 1 designates generally a frame having journalled therein the shaft 2. Fixed on the shaft 2 is a spool 3 on which the line 4 is wound. Journalled in one side of the frame 1 is a stub shaft 5 which is provided with the usual operating handle 6. Fixed on the shaft 5 for operation in the frame 1 is a gear 7 which drives a pinion gear 8 on one end portion of the spool shaft 2. Also journalled transversely in the frame 1 forwardly of the spool 3, is the usual spirally grooved shaft 9 which actuates a line evening or levelling device 10. A gear 11 on one end portion of the evener shaft 9 is driven from a gear 12 on the inner side of the gear 7.

Figure 6:
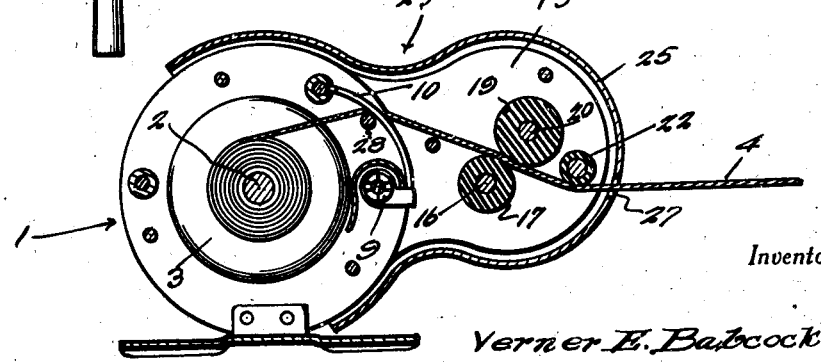
Figure 6 is a longitudinal sectional view, taken substantially on the line 6—6 of Figure 4.

Rigidly mounted on the ends of the frame 1 and projecting forwardly therefrom is a pair of plates 13 of any suitable material. Journalled in the plates 13 is a shaft 14. Mounted on one end portion of the shaft 14 is a comparatively large gear 15 which is driven by the gear 11. Also journalled in the plates 13 is a shaft 16 having mounted thereon a driven roller 17 of rubber or other suitable material. A gear 18 fixed on one end portion of the roller shaft 16 is driven by the comparatively large gear 15. The reference numeral 19 designates an idler roller which is floatingly mounted between the plates 13 for co-action with the power roller 16. As best seen in Figure 6 of the drawings, the line 4 travels between the rollers 17 and 19. The shaft 20 of the idler roller 19 is journalled in bearings in the form of inclined slots 21 which are provided therefor in the plates 13. The reference numeral 22 designates a comparatively small guide roller which is journalled between the plates 13 forwardly of the rollers 17 and 19 beneath which the line 4 travels. This is also shown to advantage in Figure 6 of the drawings.

Mounted on the frame structure 1 and projecting forwardly therefrom is a housing of any suitable material which is designated generally by the reference numeral 23. Attention is here invited to the fact that the plates 13 comprise enlarged, rounded forward end portions and the housing 23 conforms substantially thereto. The housing 23 comprises a stationary plate 24 which is fixed on the end of the frame structure 1 which carries the handle or crank 6. The housing 23 further includes a shield 25 of a shape to slip laterally over the plates 13 and the adjacent portion of the frame structure 1. A side plate 26 which is permanently mounted on the shield 25 closes the side of said shield which is remote from the plate 24. Any suitable means may, if necessary or desirable, be provided for releasably securing the shield 25 in position. The shield 25 has formed in its forward portion an opening 27 through which the line 4 travels.

It is thought that the operation of the invention will be readily apparent from a consideration of the foregoing. As the power roller 17 and spool 3 are geared together, they will travel at the same speeds relative to each other at all times. The ratio of the gears is such that the roller 17, when a cast is being made, has a constant tendency to pay the line out faster than it comes from the spool 3. Thus, the line between the roller 17 and the spool 3 is kept under tension at all times when a cast is being made, thereby positively preventing back lash and snarling. In threading the line 4, it will be observed that said line passes over a rod 28 of the frame structure 1, through the evener 10, between the rollers 17 and 19, under the roller 22 and then through the opening 27 in the housing 23. The construction and arrangement is such that as the tension on the line 4 increases, the floating roller 20 is raised, thus permitting said line to free itself of the roller 17 thereby preventing excessive wear. The floating roller 20 also readily adapts itself to lines of different thicknesses. Of course, the line 4 is normally held in frictional engagement with the power roller 17 under the weight of the roller 20. When the line is being wound the shaft 20 of the roller 19 is rotated in a direction to cause it to climb or move upwardly in the inclined slots 21 for raising said roller 19 thereby freeing said line from the action of the roller 17. It will also be observed that the construction and arrangement is such that the rollers 17, 19, 22, et cetera, interfere in no way with the functioning of the evening device 10.

It is believed that the many advantages of a fishing reel constructed in accordance with this invention will be readily understood and although a preferred embodiment of the device is as illustrated and described, it is to be understod that changes in the details and construction, and in the combination and arrangement of parts may be resorted to, which will fall within the scope of the invention as claimed.

What is claimed is:

A fishing reel comprising a frame structure having inclined slots therein, a line spool journalled in said frame structure, a power roller journalled in the frame structure, means for actuating the spool and the power roller, and an idler roller journalled in the slots and movable therein toward and away from the power roller and adapted to frictionally engage a line therewith when rotated in one direction.

VERNER E. BABCOCK.